March 7, 1950          L. GAMET          2,499,640
SPINDLE-BEARING
Filed June 18, 1946          2 Sheets-Sheet 2
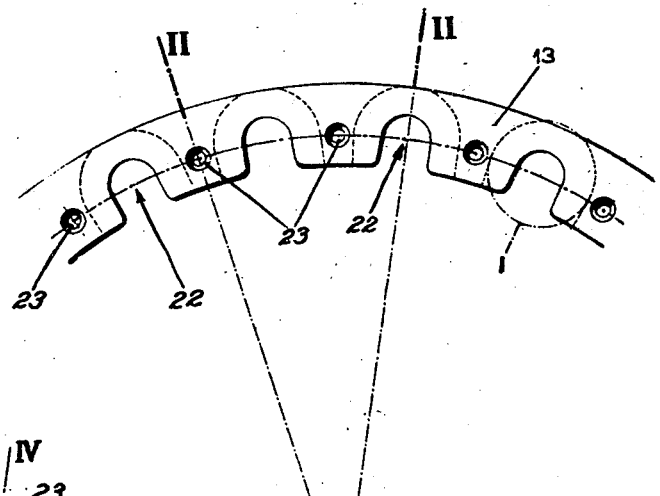
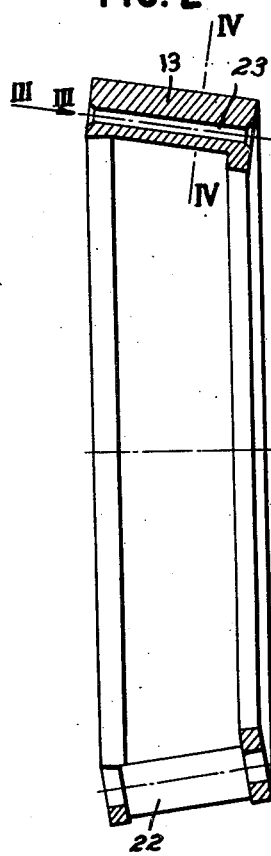
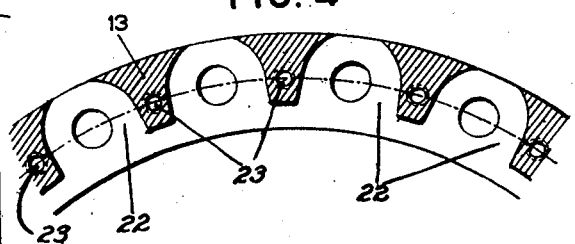

Patented Mar. 7, 1950

2,499,640

UNITED STATES PATENT OFFICE 2,499,640

SPINDLE BEARING

Louis Gamet, Bougival, France, assignor to La Precision Industrielle, Rueil-Malmaison, France, a corporation of France Application June 18, 1946, Serial No. 677,595
In France December 19, 1945

6 Claims. (Cl. 308—187)

This invention has for an object an improved bearing for machine tool applications, capable of withstanding high spindle speeds under considerable radial and thrust loads, having reduced internal wear and eliminating resonance vibrations which are present at high speeds in ordinary anti-friction bearings.

This improved bearing is based on the tapered roller principle. Conventional tapered roller bearings have relatively low speed limits under heavy loads due to friction of rollers on race ribs, which generates heat. This rapidly dilates the inner races which are mounted in opposition. Being conical, dilatation of these races increases the thrust load on roller faces which finally causes general bearing breakdown. If equal dilatation of bearing inner and outer races and corresponding longitudinal dilatation of spindle on which bearing inner races are mounted could be arranged, initial adjustment of bearing would be maintained, and correct functional conditions obtained at all speeds.

A lubricant introduced in the bearing would tend to regularize the temperature of bearing components and spindle. Anti-friction bearings however cannot function correctly at high speed when abundantly lubricated. Manufacturers recommend very scanty oil feeds or even oil mist lubrication when spindle speeds are particularly high, this being due to the fact that rolling components of anti-friction bearings (either ball or rollers) and the retainers or spacers thereof churn the oil energetically causing high temperature rise. In roller bearings, the crushing effect of the rollers on oil causes even higher temperatures to be generated. It is therefore essential that oil supplied to anti-friction bearings be limited to the quantity strictly necessary for lubrication purposes, any surplus quantity introduced for the purpose of carrying away heat, having exactly the opposite effect.

The present invention has for its principal object a bearing arranged to allow ample introduction of lubricant, which by carrying away the heat generated by high loading conditions and by equalizing temperature rise of bearing components and spindle, increases considerably the speed limits at which bearing failure is experienced.

Designed primarily for machine-tool spindle applications the new bearing incorporates additional advantages such as the elimination of resonance vibrations and the increased service obtained because of the lubrication feed to the roller sliding friction surfaces.

With the above and other objects in view which will become apparent from the detailed description below the invention is shown in the drawings in which:

Fig. 2 is an axial section of the roller retaining cage on lines II—II of Fig. 3.

Fig. 3 is a fragmentary view of said retainer as viewed in direction of arrow III—III of Fig. 2.

Fig. 4 is a partial section of said retainer on line IV—IV of Fig. 2.

Figure 1:
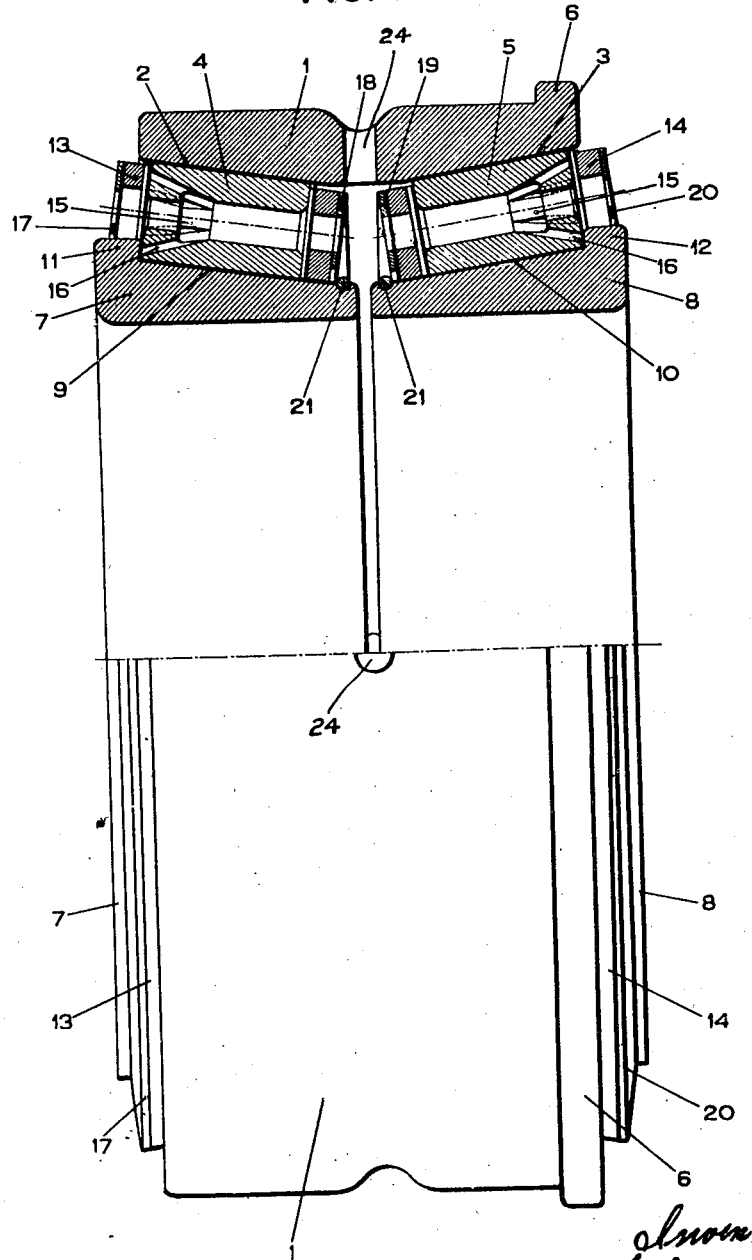
Fig. 1 is a longitudinal sectional view of a bearing according to the invention.

In the drawings wherein like reference numerals indicate like parts the outer ring of the bearing is shown at 1 and such ring may be flanged as indicated at 6. The ring 1 is provided with the conical races 2 and 3 and an aperture 24 for the introduction of a lubricant.

At the interior of the exterior ring 1 are located two separate inner rings 7 and 8 having respectively the conical raceways 9 and 10 spaced from the races 2 and 3 and provided with the roller abutment ribs 11 and 12. At the inner ends of the rings 7 and 8 which are the narrow ends of the rings, grooves are provided for wire retainers 21 which will prevent the disassembly of the cage and roller assembly.

Located between the races in the outer and inner rings are two series of conical rollers 4 and 5. The series of rollers differ by one unit so that the number of rollers in each series are prime with respect to one another thereby avoiding resonance vibrations.

The set of rollers comprising the greater number is located on the side on which thrust load is predominant i. e. on side of flange 6 in bearing represented.

Each roller is bored through the hole registering exactly opposite apertures of identical diameter in roller retaining cages 13 and 14. A groove 15 is machined in the bore of each roller and a plurality of radially extending apertures 16 connect said groove to the face of the roller in contact with the race ribs 11 and 12 which ensures improved lubrication of this point the oil flowing through the roller being partially collected by the recess and forced through the radial holes by reason of the centrifugal force generated by the high speed of rotation of the roller.

Two cages 13 and 14 are shown in detail in Figs. 2, 3 and 4. These cages can be made either of impregnated fabric or of light alloy, the former type being represented in Figs. 1, 2, 3, 4. When light alloys are used, holes 23, for the setting of rivets and plates 17, 18, 19 and 20 (Fig. 1) which ensure rigidity, may be dispensed with. The cages have formed therein spaced recesses 22 for the positioning of the rollers.

The cages 13 and 14 retain and space the rollers and also prevent oil introduced into the bearing through the hole 24 from escaping by centrifugal force along the races 2, 3, 9 and 10 and thus be caught by the rollers which would cause a temperature rise.

Cages 13 and 14 are exactly centered on races 9 and 10 and on ribs 11 and 12. No oil can therefore escape from center of bearing along races 9 and 10. Clearance between outer diameter of cages 13 and 14 and outer ring races 2 and 3 is only just sufficient to allow a slight escape of oil necessary for lubrication of races.

It will be clearly seen that excess of oil which is liberally introduced into the bearing by hole 24 can only be evacuated through the hollow rollers and corresponding apertures in retaining cages 13 and 14.

No oil churning can therefore take place and heat generated by the sliding friction of rollers on ribs 11 and 12 is carried away by the oil passing through the rollers. The great quantity of oil which can be introduced into the bearing and which is continually renewed equalizes the temperature of the different components thus preventing overloading, overheating and failure due to unequal rate of dilatation of bearing inner races, outer races and spindle.

Furthermore lubrication requirements of rollers on their races and ribs can be exactly controlled by adequate selection of oil ways section and rate of oil feed to the bearing, thus ensuring improved service.

What I claim is:

1. An improved roller-bearing comprising in combination an integral outer annular member having two opposite conical bearing surfaces formed therein, inner annular mounting means having two conical bearing surfaces formed therein, each of which is disposed in correlated relationship to one of said first mentioned surfaces, thereby forming therewith two pairs of correlated surfaces divergingly positioned with respect to each other, a first plurality of roller means mounted in one of said pairs of correlated surfaces, a second plurality of roller means mounted in the other of said pairs of correlated surfaces, one of said pluralities comprising an even number and the other of said pluralities comprising an odd number of rollers, and means for retaining said two pluralities of rollers in their respective pairs of surfaces.

2. In a tool-holding spindle an improved roller bearing comprising in combination an integral outer annular member, having two opposite conical bearing surfaces formed therein and having a radially outer positioning flange at one end thereof, two inner annular members each having a conical surface formed therein in correlated relationship to each of said first mentioned surfaces, thereby forming therewith two diverging pairs of correlated surfaces, a radially outwardly extending flange, formed at the longitudinally outer end of each of said angular members, an annular casing made of light material mounted on each of said inner annular members, spaced recesses formed in said casings, a first plurality of recessed rollers mounted in said recesses of one of said casings in cooperative relationship with one of said pairs of correlated surfaces and engaging the related one of said second mentioned outer flanges, a second plurality of rollers mounted in said recesses in said other annular casings in cooperative relationship with the other of said pairs of correlated surfaces and engaging the other of said second mentioned outer flanges, said recesses in each of said rollers comprising a longitudinal bore therethrough, an annular groove in said bore and a plurality of diverging passages extending from said groove to the outer end of said roller, whereby the lubricant may be projected under pressure through and outwardly of said rollers under the effect of centrifugal force when said roller-bearing is in operation, recesses formed through said annular casings to allow the flow of lubricant therethrough, resilient retaining means mounted on each of said angular members and engaging the inner ends of each of said annular casings.

3. An improved roller bearing comprising in combination an integral outer annular member having two opposite conical bearing surfaces formed therein, inner annular mounting means having two conical bearing surfaces formed therein, each of which is disposed in correlated relationship to one of said first mentioned surfaces, thereby forming therewith two pairs of correlated surfaces divergingly positioned with respect to each other, a first series of roller means mounted in one of said pairs of correlated surfaces, a second series of roller means mounted in the other of said pairs of correlated surfaces, one of said series comprising an even number and the other of said series comprising an odd number of rollers, and means for retaining said two series of rollers within their respective pairs of bearing surfaces.

4. For machine tool spindles an improved roller bearing comprising in combination an integral outer annular member, having two opposite conical bearing surfaces formed therein and having a radially outer positioning flange at one end thereof, two inner annular members each having a conical surface formed therein in correlated relationship to each of said first mentioned surfaces, thereby forming therewith two diverging pairs of correlated surfaces, a radially outwardly extending flange formed at the longitudinally outer end of each of said annular members, an annular casing mounted on each of said inner annular members having spaced recesses therein, a first series of rollers mounted in the recesses of one of said casings in cooperative relationship with one of said pairs of correlated surfaces and engaging the related one of said second mentioned outer flanges, a second series of rollers mounted in the recesses in said other annular casings in cooperative relationship with the other of said pairs of correlated surfaces and engaging the other of said second mentioned outer flanges, each of said rollers having a longitudinal bore therethrough, an annular groove in said bore and a plurality of diverging passages extending from said groove to the outer end of said roller, whereby lubricant may be projected under pressure through and outwardly of said rollers under the effect of centrifugal force when said roller-bearing is in operation, said annular casings having apertures to allow the flow of lubricant therethrough and retaining means mounted on each of said annular members engaging the inner ends of each of said annular casings.

5. An improved bearing comprising in combination an outer annular member having two opposite bearing surfaces formed therein, inner annular mounting means having two bearing surfaces formed therein, each of which is disposed in correlated relationship to one of said first named surfaces thereby forming therewith two pairs of correlated surfaces divergingly positioned with respect to each other, a first series of anti-friction means mounted in one of said pairs of correlated surfaces, a second series of anti-friction means mounted in the other of said pairs of correlated surfaces, one of said series comprising an even number and the other of said series comprising an odd number of anti-friction means and means for retaining said two series of anti-friction means within their respective pairs of bearing surfaces.

6. An improved roller-bearing adapted for high speed machine tool spindles comprising in combination an integral outer annular member having two opposite conical bearing surfaces formed therein, two inner annular members, each having a conical surface formed therein in correlated relationship to each of said first mentioned surfaces thereby forming therewith two diverging pairs of correlated surfaces, a radially outwardly extending flange formed at the longitudinally outer end of each of said inner annular members, a plurality of axially hollow rollers mounted in each of said pairs of correlated surfaces and engaging said flanges, retaining and spacing means for said rollers within their respective bearing surfaces occupying the space between the conical bearing surfaces of inner and outer annular members and having apertures in correlated relationship with the axial bore of said hollow rollers, whereby said apertures in said retaining means constitute the main escape for oil introduced in the bearing, and thus oil must flow through said rollers ensuring the cooling of said rollers.

LOUIS GAMET.

REFERENCES CITED

The following references are of record in the file of this patent:

UNITED STATES PATENTS

| Number | Name | Date |
|---|---|---|
| 1,927,534 | Wooler | Sept. 19, 1933 |